US008070988B2

(12) United States Patent
Shenderova et al.

(10) Patent No.: US 8,070,988 B2
(45) Date of Patent: *Dec. 6, 2011

(54) NANO-CARBON HYBRID STRUCTURES

(75) Inventors: Olga Shenderova, Raleigh, NC (US); Garry B. Cunningham, Fuquay-Varina, NC (US); Gary Elder McGuire, Chapel Hill, NC (US)

(73) Assignee: International Technology Center, Raleigh, NC (US)

( * ) Notice: Subject to any disclaimer, the term of this patent is extended or adjusted under 35 U.S.C. 154(b) by 5 days.

This patent is subject to a terminal disclaimer.

(21) Appl. No.: 12/592,354

(22) Filed: Nov. 24, 2009

(65) Prior Publication Data

US 2010/0140562 A1 Jun. 10, 2010

Related U.S. Application Data

(60) Continuation of application No. 11/787,891, filed on Apr. 18, 2007, now abandoned, which is a division of application No. 10/936,743, filed on Sep. 8, 2004, now Pat. No. 7,224,039, and a continuation-in-part of application No. 11/338,527, filed on Jan. 24, 2006, now Pat. No. 7,612,138.

(60) Provisional application No. 60/501,646, filed on Sep. 9, 2003, provisional application No. 60/842,958, filed on Sep. 8, 2006, provisional application No. 60/646,783, filed on Jan. 25, 2005.

(51) Int. Cl.
*H01B 3/24* (2006.01)

(52) U.S. Cl. ........................................ 252/570; 977/778

(58) Field of Classification Search .................. 252/570, 252/572, 502; 977/778, 779, 786, 787
See application file for complete search history.

(56) References Cited

U.S. PATENT DOCUMENTS

| 3,536,920 A | 10/1970 | Sedlak et al. |
| 3,622,432 A | 11/1971 | McCluer et al. |
| 4,938,233 A | 7/1990 | Orrison, Jr. |
| 5,404,835 A | 4/1995 | Yoder |
| 5,638,251 A | 6/1997 | Goel et al. |
| 5,640,705 A | 6/1997 | Koruga |
| 5,897,945 A | 4/1999 | Lieber et al. |
| 6,214,746 B1 | 4/2001 | Leung et al. |

(Continued)

FOREIGN PATENT DOCUMENTS

RU 2094370 10/1997

OTHER PUBLICATIONS

"Polymethylmethacrylate-montmorillonite Composites: Preparation, Characterization and Properties", Salahuddin et al., Polymer 42, pp. 8379-8385, (2001).

(Continued)

*Primary Examiner* — Charles Garber
*Assistant Examiner* — Reema Patel
(74) *Attorney, Agent, or Firm* — Miller Patent Services; Jerry A. Miller

(57) ABSTRACT

A stable colloidal suspension of carbon-based nanomaterials in a solvent has a stable colloidal suspension of nanodiamond particles having at least one additional carbon nanomaterials disbursed and agitated into the solvent to produce said suspension. This abstract is not to be considered limiting, since other embodiments may deviate from the features described in this abstract.

38 Claims, 3 Drawing Sheets

U.S. PATENT DOCUMENTS

| | | | |
|---|---|---|---|
| 6,225,939 B1 | 5/2001 | Lind | |
| 6,483,125 B1 | 11/2002 | Brousseau, III | |
| 6,486,822 B1 | 11/2002 | Peterman | |
| 6,616,794 B2 | 9/2003 | Hartman et al. | |
| 6,747,870 B2 | 6/2004 | Toh | |
| 6,909,395 B1 | 6/2005 | Carpenter | |
| 6,986,853 B2 | 1/2006 | Glatkowski et al. | |
| 7,224,039 B1* | 5/2007 | McGuire et al. | 257/532 |
| 7,420,500 B2 | 9/2008 | Treen et al. | |
| 2002/0061397 A1 | 5/2002 | Iwamura et al. | |
| 2002/0100578 A1* | 8/2002 | Withers et al. | 165/80.4 |
| 2002/0180077 A1 | 12/2002 | Glatkowski et al. | |
| 2002/0197474 A1 | 12/2002 | Reynolds | |
| 2003/0087485 A1 | 5/2003 | Leung et al. | |
| 2003/0102222 A1 | 6/2003 | Zhou et al. | |
| 2003/0235709 A1 | 12/2003 | Herron | |
| 2004/0071949 A1 | 4/2004 | Glatkowski et al. | |
| 2004/0188890 A1 | 9/2004 | Sheridan et al. | |
| 2004/0227112 A1 | 11/2004 | Howard | |
| 2005/0019114 A1* | 1/2005 | Sung | 407/119 |
| 2005/0045855 A1 | 3/2005 | Tonapi et al. | |
| 2005/0082523 A1 | 4/2005 | Blanchet-Fincher et al. | |
| 2005/0127351 A1 | 6/2005 | Tolt | |
| 2005/0158549 A1 | 7/2005 | Khabashesku et al. | |
| 2005/0202158 A1 | 9/2005 | Millas et al. | |
| 2008/0231977 A1 | 9/2008 | Schwaab et al. | |

OTHER PUBLICATIONS

"Studies on Thermal and Mechanical Properties of Polyimide-Clay Nanocomposites", Agag et al., Polymer 42, pp. 3399-3408, (2001).

"Polymer Nanocomposites: Status and Opportunities", Vaia et al., MRS Bulletin, pp. 394-401, (May 2001).

"Thermal Properties of Carbon Nanotubes and Nanotube-Based Materials", Hone et al., Appl. Phys. A 74, pp. 339-343, (2002).

"Carbon Nanotube Composites for Thermal Management", Biercuk et al., Applied Physics Letters, vol. 80, No. 15, pp. 2767-2769, (Apr. 15, 2002).

"Adhesives for Elevated-Temperature Applications", Millington et al., MRS Bulletin, pp. 428-433, (Jun. 2003).

"Low Dielectric Constant Porous Diamond Films Formed by Diamond Nanoparticles", Sakaue et al., Applied Physics Letters, vol. 83, No. 11, pp. 2226-2228, (Sep. 15, 2003).

"Self-organization in Nanocomposites Based on Detonation Nanodiamonds", Voznyakovskii, Physics of Solid State, vol. 46, No. 4, pp. 644-648, (2004).

"Model of Formation of Three Dimensional Polyurethane Films Modified by Detonation Nanodiamonds", Sirotinkin, et al., Physics of Solid State, Vo. 46, No. 4, pp. 746-747, (2004).

"Detonation Synthesis Ultradispersed Diamonds: Properties and Applications", Dolmatov, Russian Academy of Sciences and Turpion Ltd., (2001).

"Would Diamond Danorods Be Stronger Than Fullerene Nanotubes?", Shenderova, American Chemical Society, (May 1, 2003).

Web page printout from Diamond Centre website, two pages, (printed Apr. 4, 2006).

"Design of radar absorbing structures using glass/epoxy composite containing carbon black in X-band frequency ranges," Oh et al., Composites Part B—Engineering 35 (I): pp. 49-56; (2004).

"Electrical applications of carbon materials," Chung, J.Mater.Sci., 39 (8): pp. 2645-2661; (2004).

"Onion-like carbon deposition by plasma spraying of nanodiamonds," Gubarevich et al., Carbon 41 (13): pp. 2601-2606; (2003).

"Onion-like carbon and diamond nanoparticles for optical limiting," Koudoumas et al., Chem. Phys. Lett. 357, p. 336 (2002).

"Temperature Dependence of Electroresistivity, Negative and Positive Magnetoresistivity of Carbon Nanoparticles, Romanenko et al., Nanophase and Nanocomposite Materials," vol. 703, Mat. Res.Sym. Proc., pp. 259-264; (2002).

"Electromagnetic Interference Shielding Effectiveness of Carbon Materials," Chung, Carbon 39 (2); pp. 278-285; (2001).

"X-ray Emission Studies of the Valence Band of Nanodiamonds Annealed at Different Termperatures," Okotrub et al., Journal of Physical Chemistry A 105 (42): pp. 9781-9787, (Oct. 25, 2001).

"Kinetics of the Graphitization of Dispersed Diamonds at "Low" Temperatures," Butenko et al, Journal of Applied Physics 88 (7): pp. 4380-4388; (Oct. 1, 2001).

"Closed Curved Graphite-Like Structures Formation on Micron-Size Diamond," Kuznetsov et al., Chem. Phys. Lett. 289, 353, (~1998).

"Radar Absorbing Materials From Theory to Design and Characterization," Vinoy et al., Kluwer Academic Publishers, Boston, pp. 15 and 135, (1996).

"Effect of Explosion Conditions on the Structure of Detonation Soots—Ultradisperse Diamond and Onion Carbon," Kuznetsov et al., Carbon 32 (5), pp. 873-882, (1994).

"Electrical Conductivity and Electromagnetic Interference Shielding of Multiwalled Carbon Nanotube Composites Containing Fe Catalyst," Kim et al., Appl. Phys. Let. 84 (4), p. 589, (2004).

"Basics of Measuring the Dielectric Properties of Materials," Agilent Technologies Application Note, Agilent Technologies, (Apr. 28, 2005).

"Electrical Resistivity of Graphitized Ultra-Dispers Diamond and Onion-Like Carbon," Kuznetsov et al., Chemical Physics Letters 336, pp. 397-404, (Mar. 23, 2001).

"Nanotube-Diamond Composites," Gruen et al., MRS Fall Meeting, Paper #Q2.3, (Dec. 2003).

"Synthesis of Ultrananocrystalline Diamond/Nanotube Self-Composites by Direct Insertion of Carbon Dimer Molecules into Carbon Bonds,"Gruen et al., European Diamond Conference, Toulouse, France, (Sep. 2005).

"Ultrananocrystalline Diamond, Chapter 5," Gruen, William Andrew Publisher, (2006).

* cited by examiner

NANO-CARBON HYBRID STRUCTURES

CROSS REFERENCE TO RELATED DOCUMENTS

This application is a continuation application of U.S. patent application Ser. No. 11/787,891 filed Apr. 18, 2007, which is a divisional application of application Ser. No. 10/936,743 filed Sep. 8, 2004 now U.S. Pat. No. 7,224,039 which claims priority benefit of U.S. Provisional Patent Application No. 60/501,646 to McGuire et al. filed Sep. 9, 2003; and this application further claims priority benefit of U.S. Provisional Patent Application No. 60/842,958 filed Sep. 8, 2006 to Cunningham et al.; and is a continuation-in-part of U.S. patent application Ser. No. 11/338,527, filed Jan. 24, 2006 to Kuznetsov et al., which claims priority benefit of U.S. Provisional Patent Application No. 60/646,783, filed Jan. 25, 2005; and further claims priority benefit of U.S. patent application Ser. No. 10/936,743, filed Sep. 8, 2004 to McGuire, et al. Each of the applications listed in this section is hereby incorporated herein by reference.

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

BACKGROUND

Embodiments consistent with examples of this invention relate to nano-carbon hybrid structures, and more specifically, to mixtures of nanodiamonds and carbon nanotubes and/or onion-like carbon structures which can be combined with water or other solvents to form a suspension.

A number of structures involving interfaces between regions involving sp2 and sp3 bonded carbon can be formed. Each surface carbon atom on a bulk terminated diamond (111) surface is covalently bonded via three sp3 orbitals to three nearest neighbor atoms located in the first subsurface layer. The remaining sp3 orbital is oriented normal to the surface. Each surface atom also has six second nearest neighbors on the surface plane that form a hexagon with radius 0.252 nm (the second nearest neighbor distance in the diamond lattice). The radius of the hexagon formed by these surface carbon atoms is within ~6% of the radius of a (6.0) carbon nanotube ("CNT"). This relatively close mismatch, together with the orientation of the surface sp3 orbitals, has been predicted to yield relatively strong covalent bonding between a bulk diamond (111) surface and a (6.0) CNT oriented normal to the surface. Sinnot (1999) and co-workers noted this potential for strong hybrid sp2-sp3 bonding between a bulk diamond surface and CNTs, and suggested that this hybrid configuration could in principle be used to produce a CNT-diamond composite with a Young's modulus in the direction of the tubule axis that exceeds the Young's modulus of diamond in the (111) direction by 4%, with the composite having a density that is only about 80% of the density of diamond.

Expanding on the bulk diamond (111)-(6.0) CNT bonding structure, Shenderova et al (2003) systematically characterized similar hybrid bonding configurations in which the strain energy due to geometric mismatch is sufficiently small and the orbital overlap sufficiently strong that a stable sp2-sp3 hybrid interface can be formed. These structures included both metallic and semiconducting nanotubes bonded to diamond clusters or substrates, theoretically leading to different types of heterojunctions for carbon-based nanoelectronic applications, including diodes, novel quantum dots, and robust field emitters. The simulations suggested that there is sufficient flexibility in the CNTs to accommodate most of the strain from geometrical mismatches at the bulk diamond-nanotube interfaces.

Experimental observations of hybrid interfaces in carbon structures have also been reported. In work by Kuznetsov et al., for example, nanometric closed curved graphitic structures with conical or tubular forms attached to a surface of a diamond particle were observed by high-resolution transmission electron microscopy ("HRTEM") of diamond particles after high-temperature annealing. Avigal et al. and Ayres et al. have also reported simultaneous growth of hybrid structures of diamond crystallites and CNTs on the same substrate by plasma-enhanced chemical vapor deposition (CVD). In more recent work, Terranova et al. reported nanostructured carbon particles that are created in a chemical vapor deposition reactor via reactions between carbon powder and atomic hydrogen. A tubular inner structure consisting of bundles of single walled carbon nanotubes (SWCNTs) up to 15 um long, with an outer deposit consisting of well shaped diamond crystallites with diameters in the 20-100 nm range was observed.

Recently, Gruen et al. at Argonne National Laboratory achieved growth of ultrananocrystalline diamond ("UNCD") films by CVD with carbon nanotubes incorporated into it during CVD process using catalyst precursors on the surface for nucleation and growth of CNT within the hybrid structure. It is predicted by Gruen that UNCD and UNCD/CNT composites might fulfill many of the requirements that could lead to high and highly unusual thermoelectric figures of merit.

References on Gruen's work include D. M. Gruen, and J. W. Elam, "Nanotube-Diamond Composites", MRS Fall Meeting, Paper #Q2.3, (Dec. 1-5, 2003), D. Gruen, L. Curtiss, and P. Zapol, "Synthesis of Ultrananocrystalline Diamond/Nanotube Self-Composites by Direct Insertion of Carbon Dimer Molecules into Carbon Bonds", European Diamond Conference, Toulouse, France, (Sep. 11-16, 2005), and Gruen in Chapter 5 in "Ultrananocrystalline diamond", 2006, William Andrew Publisher

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which.

DETAILED DESCRIPTION

Figure 1:
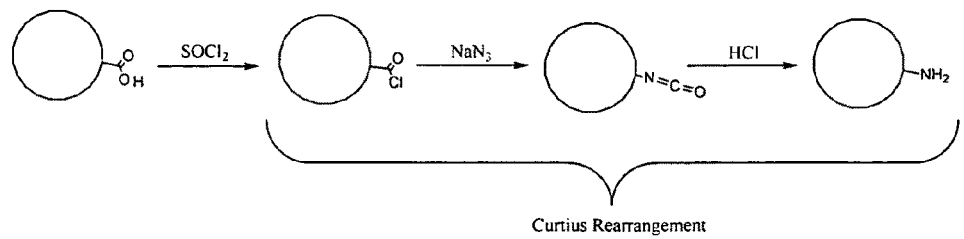
FIG. 1 shows a scheme of the production of amine functionalized nanodiamond/OLC via a Curtius rearrangement.
Figure 2:
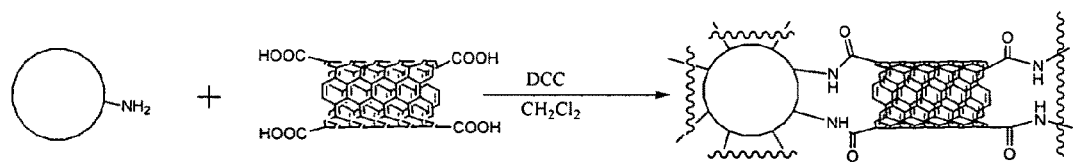
FIG. 2 shows a scheme of the coupling of amine functionalized nanodiamond/OLC with acid functionalized nanotubes. The nanodiamond is shown with only one amine group for simplicity.
Figure 3:
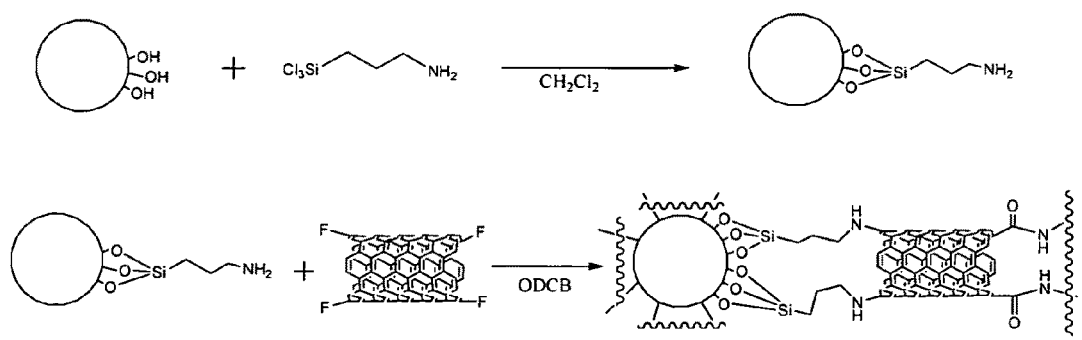
FIG. 3 shows a scheme of the coupling of APTES functionalized nanodiamond/OLC with fluorinated nanotubes.
Figure 4:
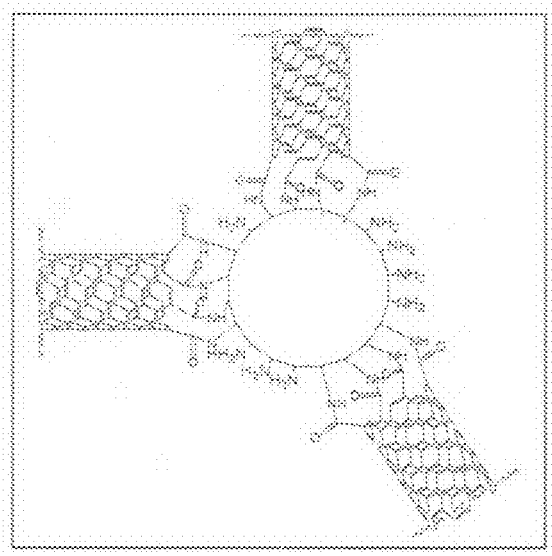
FIG. 4 shows 3-D Carbon Nano-array

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The terms nanomaterials, nanostructures, nanostructured materials, nanostructured particles and nanoelements are used interchangeably and are used to refer to particles, rods or tubes with nanoscale dimensions. When combined the resultant material may be referred to as a hybrid material or hybrid structure with the terms being usable interchangeably.

By combining two or more nanostructured materials together it is possible to obtain combined functionality or even new functionality in addition to the functionalities of the constituents. In the current invention we disclose how to create three-dimensional (3-D) network structures out of nanodiamonds ("ND"), carbon onions/onion like carbon ("OLC") and carbon nanotubes ("CNT"). Any combination of CNT/ND or OLC/ND is also possible. All of these constituents possess unique properties. ND's possess high mechanical strength, excellent chemical stability, high temperature of degradation, UV protecting properties, and photoluminescence. OLC's possesses unique conducting, magnetic, lubricating, significant radar absorption cross-section, and EM absorbing properties. Carbon nanotubes possess superior strength, unique electronic and optical properties, very high thermal conductivity, and EM absorbing properties. These properties can be combined when mechanically strong, robust layers of these carbon nanostructures are formed.

We disclose simple mechanical mixing of the components in different solvents (for example, we demonstrated mechanical mixing in water), followed by deposition of the solution containing the mixture on different substrates, and then followed by drying by evaporation under ambient conditions or under a heat lamp, UV light, on a hot plate, in a plasma system or by other means. The film which is formed following removal of solvent can result in relatively robust films over glass, Si, and alumina substrates that were used in our experiments. Other substrates can be also used. In addition, we disclose how different chemical reactions can be used in order to create chemical bonds between two or more of the nanostructured materials.

The three carbon allotropes used in the formation of nano-carbon-based hybrid structures have been widely studied; the novelty of this invention centers on the hybridization of these individual components into a new (and potentially improved) nano-carbon-based hybrid material. Applications include any area of interest where the tailoring of electrical and mechanical properties is desirable; examples include, but are not limited to, EMI shielding, capacitors, and photo-voltaic devices (solar cells).

An interesting observation important for development of these structures has been made. Carbon nanotubes are hydrophobic and cannot be dispersed in water for extended period of times; a stable colloidal solution is not formed. However, it was observed that CNT form stable suspensions in water suspensions of nanodiamonds. This effect is very pronounced for ND particle sizes 100 nm and lower since ND particles of this size themselves can form stable hydrosols. Additionally, creating suspensions in other organosols is also possible. In the case of OLC's, which do not form stable suspensions in water but can form stable suspensions when added to ND water suspensions and followed by mixing using sonication. CNT and OLC were also added to ND water suspension together (first separate suspensions of ND/CNT and ND/OLC were formed, and then the two suspensions were mixed and sonicated). Stable suspensions were formed for the three combinations of ND/CNT, ND/OLC and ND/OLC/CNT solutions. All these suspensions were stable for a period of months. The resulting nanostructures can be precipitated, for example, by centrifugation at 25,000 g within tens of minutes.

The present invention is related to a composition of matter comprising a mixture of nanodiamonds and carbon nanotubes and/or OLC in water suspension or in another solvent providing similar property of obtaining a stable suspension of CNT or OLC in this particular solvent in the presence of ND but without ND in a suspension CNT or OLC suspensions in this solvent is not stable. Thus the role of ND in allowing the formation of stable suspensions containing also CNT or OLC is disclosed. It is envisioned that such suspensions will be commercial product. A method of preparation of such suspensions includes an initial preparation of ND suspensions with particles sizes preferably less than 100 nm, addition of CNT and/or OLC and sonication or other form of mixing. The ND concentration can be up to 10%, CNT/OLC concentration can be up to 10%.

Another composition of matter includes a mixture of ND, CNT and/or OLC in a dried state (forming a film) so that all this nanostructures are more or less uniformly mixed. A method of preparation of these structures includes mixing of nanostructures in a solvent, thickening of the suspension (by centrifugation or using chemicals that enhance precipitation, for example acids, salts, or other chemicals, or by drying out excess solvent or using a rotary-evaporator). After depositing the thickened suspension on a surface the solvent can be evaporated using a hot plate, with a heat lamp, using UV, or by other means. Deposition can be achieved, for example, by different spraying techniques.

In another composition of matter nanodiamonds forming 3-dimensional structures with CNT and/or OLC and forming chemical bonds between the nanostructures are disclosed. A method of preparation of such networks from previously fabricated carbon-based nanomaterials (fabricated separately) can include chemical bonds formed, for example, by condensation reactions, radical reactions, metal catalyzed coupling, photochemical processes, sonochemical processes, irradiation of the films formed from mechanical mixture of the structures, by heat treatment, by plasma processes, or by other reactions.

The ND, CNT and OLC can be functionalized prior to formation of the final structure with a variety of surface functional groups or encapsulated with nanometals or other nanoparticles (iron oxide) with the purpose of adding additional functionality to the structure. Obviously, other nanostructures than those described can be added to the network.

Other nanocarbons can be also used. For example, diamondoids produced from crude oil can be functionalized and attached to CNT. Also, diamondoids can be incorporated inside carbon nanotubes providing additional strength or new functionality to the structures.

Examples and Comparative Examples of the present invention will hereinafter be described.

Production Example 1

Production of Amine Functionalized Nanodiamond
(Identical Procedure for Functionalized OLC)

ND-COOH: 1 g of Ch-St-16 Fraction was added to a 3 neck round bottom flask. 50 mL of concentrated nitric acid ($HNO_3$) was then added. The reaction was allowed to reflux at 120° C. for 24 hours. The resulting solid was collected by centrifugation and rinsed several times with distilled water until the washings showed a neutral pH.
Curtius Rearrangement ND-COCl: 750 mg of ND-COON was added to a three necked round bottom flask. The flask was evacuated and filled with dry nitrogen (3×). 30 mL of thionyl chloride ($SOCl_2$) was added and the reaction was allowed to stir at 70° C. for 24 hours under nitrogen atmosphere.

ND-NCO: 500 mg of ND-COCl and 1 g sodium azide ($NaN_3$) were added to a three necked round bottom flask. The flask was evacuated and filled with dry nitrogen (3×). 200 mL anhydrous dimethylformamide (DMF) was added and the reaction was allowed to stir at room temperature for 30 hours, then the temperature was increased to 100° C. for an additional 24 hours. The product was collected by centrifugation and rinsed with anhydrous DMF three times. The product was then dried in vacuum overnight at 120° C.

ND-$NH_2$: ND-NCO was sonicated in concentrated hydrochloric acid (HCl) for 8 hours. The product was then collected by centrifugation and rinsed several times with distilled water. The product was allowed to dry overnight.
Reduction of a Nitrile ND-OH: 1 g of nanodiamond was added to a 3 necked round bottom flask. The flask was evacuated and filled with dry nitrogen (3×). 30 mL of anhydrous tetrahydrofuran (THF) was added followed by 15 mL of a 2.0 M solution of lithium aluminum hydride ($LiAlH_4$) in THF. The reaction was allowed to stir overnight at room temperature. The unreacted lithium aluminum hydride was neutralized by adding small amounts of water slowly until hydrogen evolution subsided. The product was then collected by centrifugation and rinsed several times with THF.

ND-OTs: 750 mg of ND-OH and 500 mg tosyl chloride were added to a three necked round bottom flask. 20 mL anhydrous THF and 20 mL anhydrous pyridine were then added. The reaction was allowed to stir overnight. The product was collected by centrifugation and rinsed several times with THF.

ND-CN: 750 mg of ND-OTs and 750 mg sodium cyanide (NaCN) were added to a three necked round bottom flask. The flask was evacuated and filled with dry nitrogen (3×). 50 mL anhydrous ethanol was added and the reaction was allowed to reflux under nitrogen overnight. The product was collected by centrifugation and rinsed several times with anhydrous ethanol.

ND-$NH_2$: The nitrile functionalized nanodiamond was added to a three necked round bottom flask. The flask was evacuated and filled with dry nitrogen (3×). 20 mL anhydrous THF and 20 mL of a 2.0M solution of $LiAlH_4$ in THF were added. The reaction was allowed to stir overnight. The unreacted lithium aluminum hydride was neutralized by adding small amounts of water slowly until hydrogen evolution subsided. The product was collected by centrifugation and rinsed several times with THF.

Production Example 2

Acid Functionalization of Nanotubes

NT-COOH: 100 mg of multi-walled nanotubes (MWNT) was added to a single neck round bottom flask. Added 30 mL concentrated sulfuric acid ($H_2SO_4$) and 10 mL concentrated nitric acid. The mixture was sonicated for 8 hours. The product was then allowed to settle overnight. The product was collected by centrifugation, rinsed several times with distilled water, and subsequently precipitated.

Production Example 3

Amide Bond Coupling of Nanodiamond to
Nanotubes (Again Procedure Identical with OLC
Instead of ND)

The acid functionalized nanotubes (NT-COOH) of Production Example 2 were added along with 100 mg of the amine functionalized nanodiamond (ND-$NH_2$) of Production Example 2 and 200 mg of coupling agent (DCC, etc.). The flask was evacuated and filled with dry nitrogen (3×). 80 mL of methylene chloride ($CH_2Cl_2$) was added. The reaction was allowed to stir at room temperature for 1 week. The solvent was removed under vacuum. The product was then rinsed several times with distilled water followed by several times with warm acetone. The product was then collected by centrifugation and allowed to dry overnight.

Production Example 4

Silane Chemistry Formation of Chemical Bond
Between ND/OLC and Nanotube

ND-APTES/OLC-APTES: Starting with ND-OH/OLC-OH added 5 wt % of 3-aminopropyltriethoxysilane (APTES) in methylene chloride. Stirred for 24 hours under nitrogen atmosphere. Product was collected by centrifugation and rinsed several times with methylene chloride.

ND-NT/OLC-NT: Starting with equivalent amounts of fluorinated SWNT and APTES functionalized NT/OLC added ortho-dichlorobenzene and reaction was allowed to stir for 24 hours at 130° under nitrogen atmosphere. Product was allowed to cool to room temperature and was collected by centrifugation and rinsed several times with dry methylene chloride.
Production of CNT-ND Films Obtained by Mixing of the CNT/DND.

Figure 5:
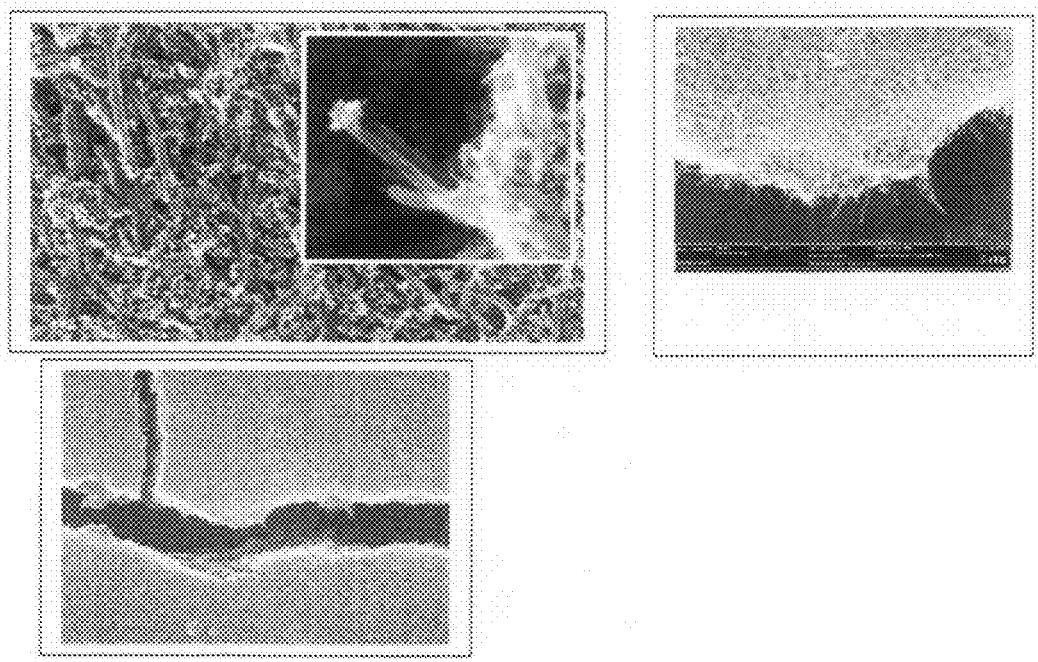
FIG. 5 shows a scanning electron micrograph of CNT-ND hybrid film (inset shows high-magnification of isolated CNT with ND on tip).
Figure 6:
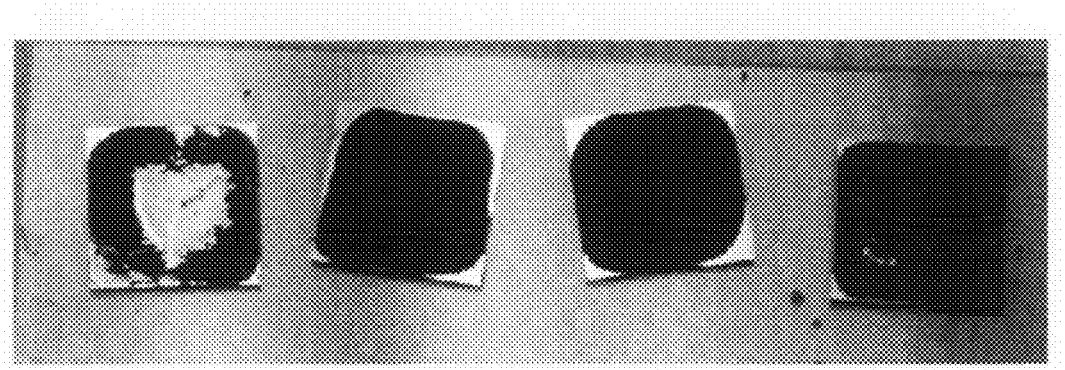
FIG. 6 shows a Scotch tape test for CNT-ND films A-D from the table 2.
Figure 7:
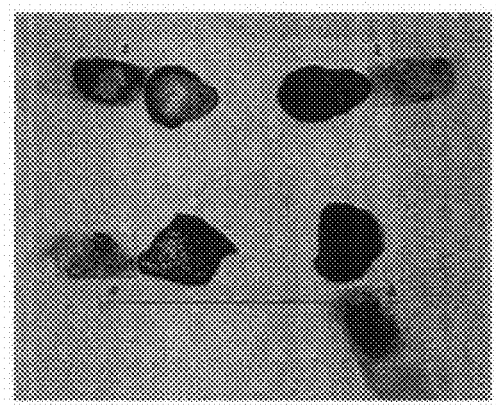
FIG. 7 shows a Scotch tape test for CNT-ND films A-D from the table 2 which were heat lamp treated.
Figure 8:
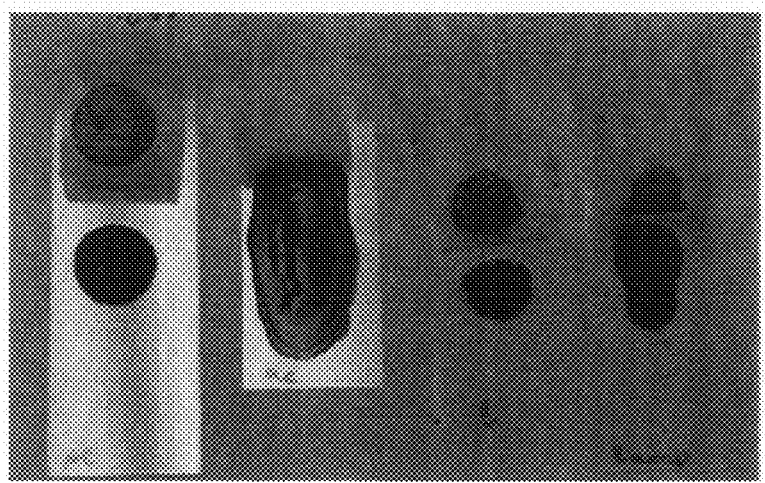
FIG. 8 shows a Scotch tape test for CNT-ND films for the same batch as the hybrids treated in CF4 plasma. From left to right in the row, the following treatments were used: hot plate, addition of polyacrylic coating, and 2 samples prepared by lamp heating.

Preliminary hybrid films have been produced. Mechanical mixing and ultrasonic agitation were used; physical drying (using hot plate or heat lamp) of films on various substrates was examined (alumina, glass, silicon wafer) as well as electro-deposition of films from suspension. SEM images are provided in FIG. 5 showing the produced structures. The excellent uniformity of CNT distributed within the ND matrix can be seen. Table 1 summarizes the performed experiments on the fabrication of hybrid structures. Treatment of films was also performed in atmospheric-pressure $CF_4$ plasma. Some preliminary data characterizing the hybrid structures is shown in Table 2. It was realized that the incorporation of OLC into CNT-ND suspensions can improve dispersion (inter-mixing of the two primary allotropes, CNT and ND). The structures produced by the methods listed in Table 2 were tested on their adhesion to the alumina substrate. The results of a scotch-tape test are illustrated in FIGS. 6 and 7. Some of the films are quite robust and have reasonable adhesion to the substrate even without generation of covalent chemical bonds between CNT-ND.

TABLE 1

Experiments to produce CNT/ND/OLC composites

| system | observation | SEM | comments |
|---|---|---|---|
| 10 mg short CNT; 10 mg of OLC (1800K); in 6 ml of ND(80 nm) each water suspension (~0.4 wt %); mixed 2 ml each - got CNT/ND/OLC suspension | In 4 hrs all were stable (pictures taken) | ND attached to CNT | |
| CNT/ND dried under UV (microscope) CNT array sonicated in ND suspension dried in UV; another series - under heat lamp | ND well dispersed between CNT | SEM taken taken | |
| Electrophoresis of CNT array (+) with 60 nm ND suspension | | taken | 30 V/2 cm, 5 min |
| CNT-ND droplet on Si dried with heat lamp; Same - on alumina | Very dense film formed on alumina, no cracks | taken | |
| CNT-ND suspension electrodeposited on Si | | taken | 35 V/cm |
| CNT-ND water suspension added to DMSO, dried with heat lamp | | taken | |
| 6 ml 20 nm ND (0.5%) & 16 mg CNT (~0.27% CNT) mixed dryed on a hot plate or heat lamp | Dense strong films; heat lamps look better | Taken | Glass and alumina substrates; conductive |
| | $CF_4$ plasma treated film on alumina (2 samples - lamp and plate) | Taken, holes formed | |
| Polyacrylate (water based) added, on glass with CNT-ND, strong film formed | Not conductive | | |

TABLE 2

Preliminary hybrid fabrication and characterization

| Composition (ND/CNT) | CNT wt % | Adhesion (via tape test) | Sheet resistance [alumina substrate] (1 cm spacing) | Resistance on Si |
|---|---|---|---|---|
| A. 1.3% ND 4 ml (50 mg)/10.3 mg MWCNT | 17% | Bad | insulating | |
| B. 0.5% ND 4 ml (21 mg)/10.3 mg MWCNT | 33% | Good | 9 kohm | High |
| C. 0.5% ND 4 ml (21 mg)/20.2 mg MWCNT | 50% | Good | 3 kohm | High (after tape test) |
| D. 0.5% ND 4 ml (21 mg)10.3 mg MWCNT + acrylic | 33% | Medium | 40 Mohm | |

Envisioned applications of the structures include protective coatings (from UV, IR radiation, EMI), armor and wear-resistant coatings with additional functions, strong coatings with lubricating ability, particles formed from the structures for detoxification (large area to confine toxins), capacitors in electrical devices, solar cells, structures with enhanced thermal conductivity, and other applications.

Thus, in accord with certain example embodiments, a stable colloidal suspension of carbon-based nanomaterials in a solvent is made of a stable colloidal suspension of nanodiamond particles having at least one additional carbon nanomaterials disbursed and agitated into the solvent to produce said suspension.

In certain implementations, the additional carbon-based nanomaterials are mixed with a solvent prior to disbursing into the nanodiamond suspension and agitated for dispersing. In certain implementations, the additional carbon-based nanomaterials are comprised of predominantly sp2 carbon bonded materials. In certain implementations, the additional carbon-based nanomaterials comprise at least one of carbon nanotubes and carbon onions. In certain implementations, at least one additional nanomaterial is disbursed into the suspension where the additional nanomaterial comprises a non-carbon based nanomaterial. In certain implementations, the average aggregate size of nanodiamond particles is smaller than approximately 100 nm. In certain implementations, the nanodiamond particles are functionalized or encapsulated with metals or other nanoparticles. In certain implementations, the concentration of nanodiamond particles in the suspension is below approximately 10 wt %. In certain implementations, the concentration of each additional nanomaterial is below approximately 10 wt %. In certain implementations, at least one of the carbon nanomaterials is functionalized. In certain implementations, the additional carbon-based nanomaterials can be at least one of carbon nanotubes and carbon onions. In certain implementations, the diamond nanoparticles play the role of surfactant for carbon nanotubes.

Another stable colloidal suspension of carbon-based nanomaterials and a polymer in a solvent involves a stable colloidal suspension of nanodiamond particles having additional carbon-based nanomaterials disbursed into the suspension, wherein the solvent comprises a solvent to the polymer, and a polymer admixed into the colloidal suspension.

In certain implementations, the additional carbon-based nanomaterials are mixed with the solvent prior to dispersion into the nanodiamond suspension by agitation. In certain implementations, the additional carbon-based nanomaterials are comprised of predominantly sp2 carbon bonded materials. In certain implementations, the additional carbon-based nanomaterials comprise at least one of carbon nanotubes and carbon onions. In certain implementations, at least one additional nanomaterial dispersed into the suspension, where the at least one additional nanomaterial comprises a non-carbon based nanomaterial. In certain implementations, the average aggregate size of nanodiamond particles is smaller than approximately 100 nm. In certain implementations, the nanodiamond particles are functionalized or encapsulated with metals or other nanoparticles. In certain implementations, the concentration of nanodiamond particles in the suspension is below approximately 10 wt %. In certain implementations, the concentration of each additional nanomaterial is below approximately 10 wt %. In certain implementations, at least one of the carbon nanomaterials is functionalized. In certain implementations, diamond nanoparticles play the role of surfactant for carbon nanotubes.

Another material including uniformly mixed carbon-based nanomaterials, has a substrate; a stable colloidal suspension of nanodiamond particles dispersed with additional carbon-based nanomaterials into a solvent to form the suspension; and the stable colloidal suspension is thickened or deposited onto the substrate with the solvent removed.

In certain implementations, the additional carbon-based nanomaterials are comprised of predominantly sp2 carbon bonded materials. In certain implementations, the additional carbon-based nanomaterials comprise at least one of carbon nanotubes and carbon onions. In certain implementations, at least one additional nanomaterial dispersed into the suspension that comprises a non-carbon based nanomaterial. In certain implementations, the average aggregate size of nanodiamond particles is smaller than approximately 100 nm. In certain implementations, the nanodiamond particles are functionalized or encapsulated with metals or other nanoparticles. In certain implementations, the concentration of nanodiamond particles in the suspension is below approximately 10 wt %. In certain implementations, the concentration of each additional nanomaterial is below approximately 10 wt %. In certain implementations, at least one of the carbon nanomaterials is functionalized. In certain implementations, the diamond nanoparticles play the role of surfactant for carbon nanotubes. In certain implementations, the suspension is deposited on the substrate using electric fields. In certain implementations, the suspension is deposited on the substrate by a thermal spray technique. In certain implementations, the suspension is deposited on the substrate by a cold spray technique.

Another nanocomposite material of uniformly mixed and chemically bonded carbon-based nanomaterials has a stable colloidal suspension of nanodiamond particles having a dispersion of additional carbon-based nanomaterials into the said suspension with a solvent, wherein a chemical bond is formed between the nanomaterials and the solvent is removed from the material. In certain implementations, the carbon-based nanomaterials are chemically bonded by condensation reactions, radical reactions, metal catalyzed coupling, photochemical processes, sonochemical processes, irradiation of the films formed from mechanical mixture of the structures, by heat treatment, or by plasma processes.

A method of producing a stable colloidal suspension of carbon-based nanomaterials in a solvent, involves providing a stable colloidal suspension of nanodiamond particles; disbursing one or more than one additional carbon nanomaterials into the said suspension; and agitating the suspension. In certain implementations, the additional carbon-based nanomaterials were first mixed with the solvent and then the mixture was disbursed into the said nanodiamond suspension and agitated for dispersing.

Another method of producing a stable colloidal suspension of carbon-based nanomaterials and a polymer in a solvent involves providing a stable colloidal suspension of nanodiamond particles; disbursing additional carbon-based nanomaterials into the said suspension, wherein the solvent comprises a solvent to the polymer; and admixing the colloidal suspension with the polymer.

Another method of producing a material consisting of uniformly mixed carbon-based nanomaterials involves providing a stable colloidal suspension of nanodiamond particles; disbursing additional carbon-based nanomaterials into the said suspension; agitating the suspension for better dispersion; thickening and/or deposition of the suspension onto a substrate; and removing the solvent.

In certain implementations, the nanomaterials are deposited using electric fields. In certain implementations, the nanomaterials are deposited by a thermal spray technique. In certain implementations, the nanomaterials are deposited by a cold spray technique.

Another method of producing a nanocomposite material consisting having mixed and chemically bonded carbon-based nanomaterials involves providing a stable colloidal suspension of nanodiamond particles; disbursing additional carbon-based nanomaterials into the said suspension; agitating the suspension for better dispersion; forming chemical bonds between the nanomaterials; and removing the solvent. In certain implementations, the carbon-based nanomaterials are chemically bonded by condensation reactions, radical reactions, metal catalyzed coupling, photochemical processes, sonochemical processes, irradiation of the films formed from mechanical mixture of the structures, by heat treatment, by plasma processes, or by other means.

Another method of producing a nanocomposite material having uniformly mixed carbon-based nanomaterials and polymer involves providing a stable colloidal suspension of nanodiamond particles; disbursing additional carbon-based nanomaterials into the said suspension, wherein the solvent comprises a solvent to the polymer; admixing the colloidal suspension with the polymer and curing the nanocomposite.

While certain illustrative embodiments have been described, it is evident that many alternatives, modifications, permutations and variations will become apparent to those skilled in the art in light of the foregoing description.

The invention claimed is:

1. A stable colloidal suspension of carbon-based nanomaterials in a solvent, comprising:
   a stable colloidal suspension of nanodiamond particles having at least one additional carbon-based nanomaterials disbursed and agitated into the solvent to produce said suspension.

2. The suspension according to claim 1, wherein the additional carbon-based nanomaterials are mixed with a solvent prior to disbursing into the nanodiamond suspension and agitated for dispersing.

3. The suspension according to claim 1, wherein the additional carbon-based nanomaterials are comprised of predominantly sp2 carbon bonded materials.

4. The suspension according to claim 1, wherein the additional carbon-based nanomaterials comprise at least one of carbon nanotubes and carbon onions.

5. The suspension according to claim 1, further comprising at least one additional nanomaterial disbursed into the suspension where the additional nanomaterial comprises a non-carbon based nanomaterial.

6. The suspension according to claim 1, wherein the average aggregate size of nanodiamond particles is smaller than approximately 100 nm.

7. The suspension according to claim 1, wherein the nanodiamond particles are functionalized or encapsulated with metals or other nanoparticles.

8. The suspension according to claim 1, wherein the concentration of nanodiamond particles in the suspension is below approximately 10 wt %.

9. The suspension according to claim 1, wherein the concentration of each additional nanomaterial is below approximately 10 wt %.

10. The suspension according to claim 1, wherein at least one of the carbon-based nanomaterials is functionalized.

11. The suspension according to claim 1, wherein the additional carbon-based nanomaterials comprise at least one of carbon nanotubes and carbon onions.

12. The suspension according to claim 1, where the diamond nanoparticles play the role of surfactant for carbon nanotubes.

13. A stable colloidal suspension of carbon-based nanomaterials and a polymer in a solvent, comprising:
  a stable colloidal suspension of nanodiamond particles having additional carbon-based nanomaterials disbursed into the suspension, wherein the solvent comprises a solvent to the polymer; and
  a polymer admixed into the colloidal suspension.

14. The suspension according to claim 13, wherein the additional carbon-based nanomaterials are mixed with the solvent prior to dispersion into the nanodiamond suspension by agitation.

15. The suspension according to claim 13, wherein the additional carbon-based nanomaterials are comprised of predominantly sp2 carbon bonded materials.

16. The suspension according to claim 13, wherein the additional carbon-based nanomaterials comprise at least one of carbon nanotubes and carbon onions.

17. The suspension according to claim 13, further comprising at least one additional nanomaterial dispersed into the suspension, where the at least one additional nanomaterial comprises a non-carbon based nanomaterial.

18. The suspension according to claim 13, wherein the average aggregate size of nanodiamond particles is smaller than approximately 100 nm.

19. The suspension according to claim 13, wherein the nanodiamond particles are functionalized or encapsulated with metals or other nanoparticles.

20. The suspension according to claim 13, wherein the concentration of nanodiamond particles in the suspension is below approximately 10 wt %.

21. The suspension according to claim 13, wherein the concentration of each additional nanomaterial is below approximately 10 wt %.

22. The suspension according to claim 13, wherein at least one of the carbon nanomaterials is functionalized.

23. The suspension according to claim 13 where diamond nanoparticles play the role of surfactant for carbon nanotubes.

24. A material including uniformly mixed carbon-based nanomaterials, comprising:
  a substrate;
  a stable colloidal suspension of nanodiamond particles dispersed with additional carbon-based nanomaterials into a solvent to form the suspension; and
  wherein the stable colloidal suspension is thickened or deposited onto the substrate with the solvent removed.

25. The material according to claim 24, wherein the additional carbon-based nanomaterials are comprised of predominantly sp2 carbon bonded materials.

26. The material according to claim 24, wherein the additional carbon-based nanomaterials comprise at least one of carbon nanotubes and carbon onions.

27. The material according to claim 24, further comprising at least one additional nanomaterial dispersed into the suspension that comprises a non-carbon based nanomaterial.

28. The material according to claim 24, wherein the average aggregate size of nanodiamond particles is smaller than approximately 100 nm.

29. The material according to claim 24, wherein the nanodiamond particles are functionalized or encapsulated with metals or other nanoparticles.

30. The material according to claim 24, wherein the concentration of nanodiamond particles in the suspension is below approximately 10 wt %.

31. The material according to claim 24, wherein the concentration of each additional nanomaterial is below approximately 10 wt %.

32. The material according to claim 24, wherein at least one of the carbon nanomaterials is functionalized.

33. The material according to claim 24, where the diamond nanoparticles play the role of surfactant for carbon nanotubes.

34. The material according to claim 24, wherein the suspension is deposited on the substrate using electric fields.

35. The material according to claim 24, wherein the suspension is deposited on the substrate by a thermal spray technique.

36. The material according to claim 24, wherein the suspension is deposited on the substrate by a cold spray technique.

37. A nanocomposite material of uniformly mixed and chemically bonded carbon-based nanomaterials, comprising:
  a stable colloidal suspension of nanodiamond particles having a dispersion of additional carbon-based nanomaterials into the said suspension with a solvent;
  wherein a chemical bond is formed between the nanomaterials and the solvent is removed from the material.

38. The material according to claim 37, wherein the carbon-based nanomaterials are chemically bonded by condensation reactions, radical reactions, metal catalyzed coupling, photochemical processes, sonochemical processes, irradiation of the films formed from mechanical mixture of the structures, by heat treatment, or by plasma processes.

* * * * *